(12) United States Patent
Kim et al.

(10) Patent No.: US 11,456,625 B2
(45) Date of Patent: Sep. 27, 2022

(54) POWER TRANSMISSION DEVICE AND METHOD FOR DETECTING METAL SUBSTANCE

(71) Applicant: Samsung Electronics Co., Ltd., Gyeonggi-do (KR)

(72) Inventors: Kwangseob Kim, Gyeonggi-do (KR); Changhak O, Gyeonggi-do (KR); Kihyun Kim, Gyeonggi-do (KR); Dongzo Kim, Gyeonggi-do (KR); Jihye Kim, Gyeonggi-do (KR); Yunjeong Noh, Gyeonggi-do (KR); Kyungmin Lee, Gyeonggi-do (KR); Hyungkoo Chung, Gyeonggi-do (KR); Mincheol Ha, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 141 days.

(21) Appl. No.: 16/936,496

(22) Filed: Jul. 23, 2020

(65) Prior Publication Data

US 2021/0036554 A1 Feb. 4, 2021

(30) Foreign Application Priority Data

Aug. 2, 2019 (KR) ........................ 10-2019-0094584

(51) Int. Cl.
*H02J 50/60* (2016.01)
*H02J 50/80* (2016.01)
*H02J 50/10* (2016.01)

(52) U.S. Cl.
CPC .............. *H02J 50/60* (2016.02); *H02J 50/10* (2016.02); *H02J 50/80* (2016.02)

(58) Field of Classification Search
CPC ...................................................... H02J 50/60
(Continued)

(56) References Cited

U.S. PATENT DOCUMENTS

2014/0225628 A1 8/2014 Yoon et al.
2017/0331334 A1 11/2017 Park
(Continued)

FOREIGN PATENT DOCUMENTS

JP 2018107944 A * 7/2018 .............. H02J 5/005
KR 10-2016-0061121 A 5/2016
(Continued)

OTHER PUBLICATIONS

International Search Report dated Oct. 27, 2020.

*Primary Examiner* — Edward Tso
*Assistant Examiner* — Ahmed H Omar
(74) *Attorney, Agent, or Firm* — Cha & Reiter, LLC

(57) ABSTRACT

According to certain embodiments, a power transmission device comprises an induction circuit configured to transmit a wireless power signal through a charging pad and receive a signal from an external device; and at least one processor operatively connected to the induction circuit, wherein the processor is configured to: enter a wireless charging protection mode for wireless charging of the external device, measure a current value of the wireless power signal, and release the wireless charging protection mode when the packet information is not included in the signal transmitted from the external device and the measured current value or variation of the current value exceeds a threshold value.

20 Claims, 10 Drawing Sheets

(58) Field of Classification Search
USPC .......................................................... 320/108
See application file for complete search history.

(56) References Cited

U.S. PATENT DOCUMENTS

| | | | |
|---|---|---|---|
| 2018/0351391 A1 | 12/2018 | Park | |
| 2019/0148987 A1* | 5/2019 | Jung | ........................ H02J 50/10 |
| | | | 307/104 |
| 2019/0165618 A1* | 5/2019 | Chen | ........................ H02J 7/025 |
| 2020/0204009 A1* | 6/2020 | Park | ........................ H02J 50/20 |

FOREIGN PATENT DOCUMENTS

| | | | |
|---|---|---|---|
| KR | 10-2017-0102454 A | 9/2017 | |
| KR | 10-2018-0121135 A | 11/2018 | |
| WO | 2019/045350 A2 | 3/2019 | |

* cited by examiner

POWER TRANSMISSION DEVICE AND METHOD FOR DETECTING METAL SUBSTANCE

CROSS-REFERENCE TO RELATED APPLICATION

This application is based on and claims priority under 35 U.S.C. § 119 to Korean Patent Application No. 10-2019-0094584 filed on Aug. 2, 2019, in the Korean Intellectual Property Office, the disclosure of which is herein incorporated by reference in its entirety.

BACKGROUND

1. Field

Certain embodiments of the disclosure relate to a power transmission device and method for detecting a metal substance.

2. Description of Related Art

An electronic device can perform wireless charging or noncontact charging using a wireless power transfer technology. The wireless power transfer technology may be a technology, whereby a power is wirelessly transferred from a power transmission device (e.g., wireless charger) to a power reception device (e.g., electronic device) without physical connection by a separate connector between the power reception device and the power transmission device, and a battery of the power reception device is charged with the transferred power. The wireless power transfer technology may include a magnetic induction type and a magnetic resonance type, and in addition, it may include various types of wireless power transfer technologies.

The above information is presented as background information only to assist with an understanding of the disclosure. Not determination has been made, and not assertion is made, as to whether any of the above might be applicable as prior art with regard to the disclosure.

SUMMARY

According to certain embodiments, a power transmission device comprises an induction circuit configured to transmit a wireless power signal through a charging pad and receive a signal from an external device; and at least one processor operatively connected to the induction circuit, wherein the processor is configured to: enter a wireless charging protection mode for wireless charging of the external device, measure a current value of the wireless power signal, and release the wireless charging protection mode when the packet information is not included in the signal transmitted from the external device and the measured current value or variation of the current value exceeds a threshold value.

In certain embodiments, a power transmission device comprises an induction circuit configured to transmit a wireless power signal through a charging pad and receive a signal from an external device; and at least one processor operatively connected to the induction circuit, wherein the at least one processor is configured to: enter a wireless charging protection mode for wireless charging of the external device, measure a current value of the wireless power signal when packet information is not included in the signal from the external device, and release the wireless charging protection mode when the current value or the variation of the current value exceeds the threshold value and the signal from the external device does not include the packet information.

In certain embodiments, a method for operating an electronic device comprises entering a wireless charging protection mode for wireless charging of an external device; measuring a current value of a wireless power signal transmitted through a charging pad; identifying whether the measured current value or a variation of the current value exceeds a threshold value; identifying whether packet information is included in a signal transmitted from the external device if the current value or the variation of the current value exceeds the threshold value; and releasing the wireless charging protection mode if the packet information is not included in the signal.

BRIEF DESCRIPTION OF THE DRAWINGS

The above and other aspects, features and advantages of certain embodiments of the disclosure will be more apparent from the following detailed description, taken in conjunction with the accompanying drawings, in which.

DETAILED DESCRIPTION

Figure 1:
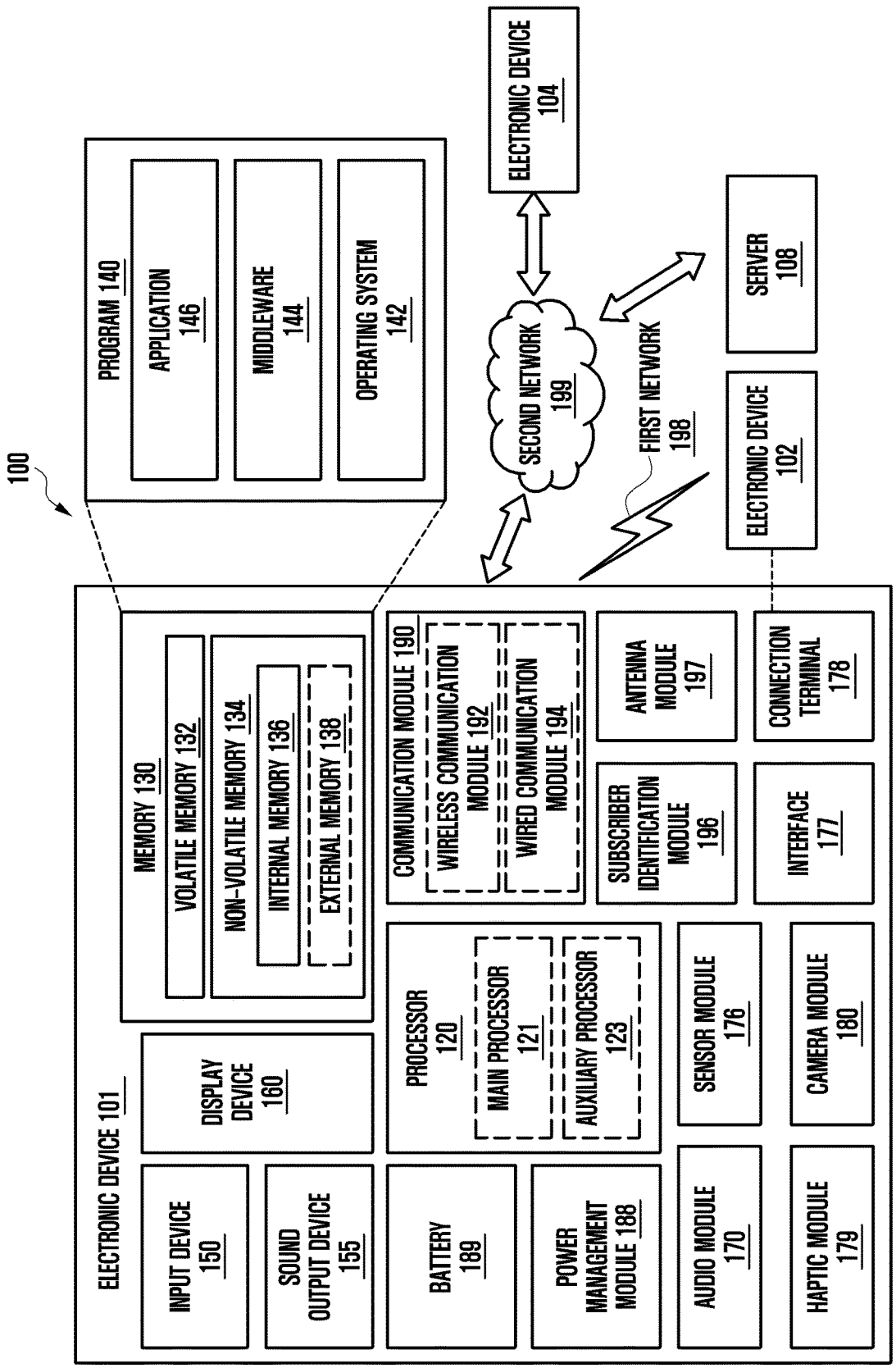
FIG. 1 is a block diagram of an electronic device in a network environment according to certain embodiments of the disclosure.

In using the wireless power transfer technology, the power transmission device (e.g., wireless charger) may function in a wireless charging protection mode for detecting a metal substance. The wireless charging protection mode may be a mode where the power transmission device detects the existence/nonexistence of a metal substance, and prevents inadvertent heating of the metal substance by performing wireless charging of a power reception device (e.g., electronic device). The power transmission device may identify existence/nonexistence of the power reception device, and if the power reception device does not exist, the power transmission device may release the wireless charging protection mode.

If data is not received from the power reception device, the power transmission device may determine that the power reception device has been removed, and may release the wireless charging protection mode. Because the power transmission device determines the existence/nonexistence of the power reception device, and releases the wireless charging protection mode, the wireless charging protection mode may be released even in the case where a metal substance remains on a charging pad of the power transmission device. Due to the wireless power being transmitted from the power transmission device, the metal substance may be heated to cause a burn and a fire to occur.

Certain embodiments of the disclosure can determine both the existence/nonexistence of a power reception device and the existence/nonexistence of a metal substance on a charging pad of a power transmission device in releasing a wireless charging protection mode. Certain embodiments of the disclosure provide a method for lowering a possibility of heating the metal substance in the case where the metal substance remains on the charging pad of the power transmission device.

The power transmission device according to certain embodiments of the disclosure can determine the existence/nonexistence of the power reception device and the existence/nonexistence of the metal substance, and can release the wireless charging protection mode if both the power reception device and the metal substance are not sensed. Certain embodiments of the disclosure can prevent a malfunction related to the release of the wireless charging protection mode.

Certain embodiments of the disclosure can lower the possibility of the heat generation due to the metal substance by maintaining the wireless charging protection mode if the metal substance remains on the charging pad of the power transmission device. Certain embodiments of the disclosure can prevent a possible burn, fire, and/or unpleasant feelings caused by the heat generation of the metal substance. Further, certain embodiments of the disclosure can prevent the performances of the power transmission device and the power reception device from deteriorating due to the heat generation of the metal substance. In addition, various effects directly or indirectly obtained through the disclosure can be provided.

Effects that can be obtained in the disclosure are not limited to the above-described effects, and other unmentioned effects can be clearly understood by those of ordinary skill in the art to which the disclosure pertains from the following description.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 (e.g., DRAM, SRAM or SDRAM) may include the volatile memory 132 or the non-volatile memory 134.

The program 140 may be stored in the memory 130 as software, and may include, for example, an operating system (OS) 142, middleware 144, or an application 146 (e.g., application program).

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerator sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service.

The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
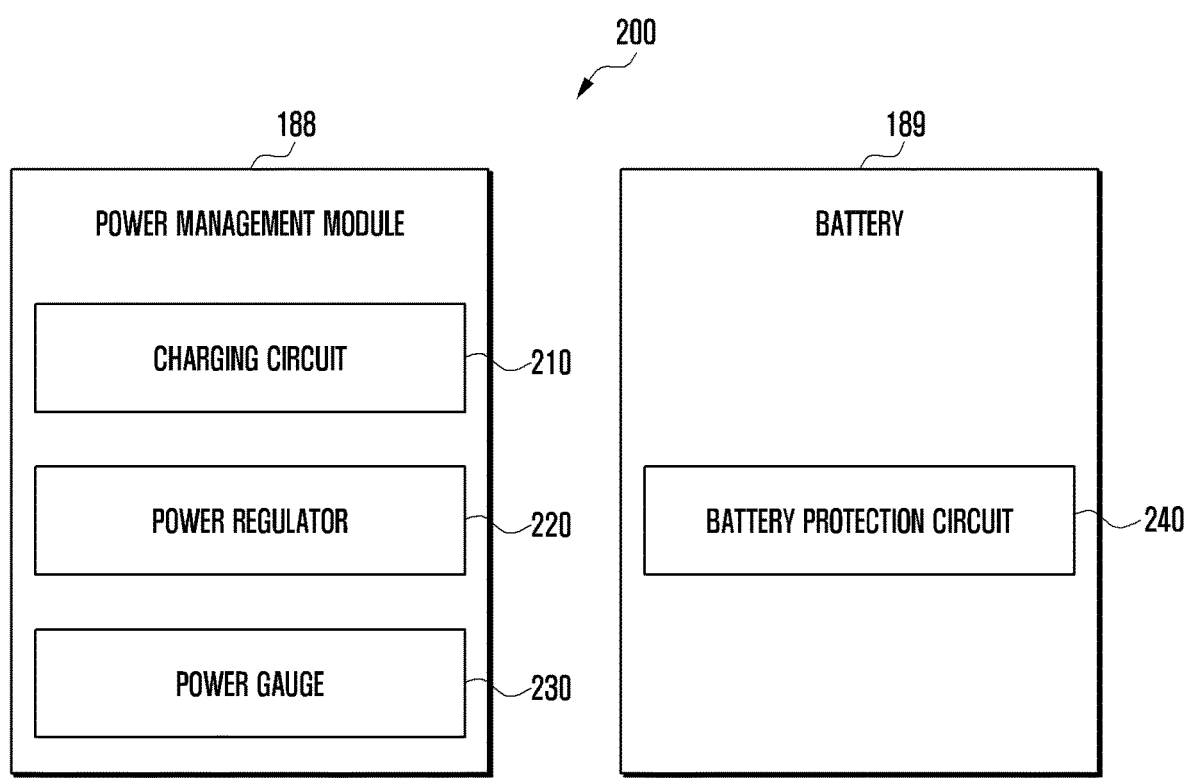
FIG. 2 is a block diagram of a program according to certain embodiments.

FIG. 2 is a block diagram 200 of a power management module (e.g., 188) and a battery (e.g., 189) according to certain embodiments. With reference to FIG. 2, the power management module 188 may include a charging circuit 210, a power regulator 220, or a power gauge 230.

The charging circuit 210 may charge the battery 189 using a power being supplied from an external power supply for an electronic device 101. According to an embodiment, the charging circuit 210 may select a charging type (e.g., normal charging or quick charging) based on at least a part of the kind of the external power supply (e.g., power adapter, USB, or wireless charging), the size of a power that can be supplied from the external power supply (e.g., about 20 W or more), or an attribute of the battery 189, and the charging circuit 210 may charge the battery 189 using the selected charging type. For example, the external power supply may be connected by wire through a connection terminal (e.g., 178), or may be wirelessly connected through an antenna module (e.g., 197).

The power regulator 220 may generate different power levels by regulating voltage levels or current levels of the power being supplied from the external power supply to the battery 189. The power regulator 220 may regulate the power of the external power supply to the battery 189 to the voltage or current levels suitable to respective constituent elements included in the electronic device 101. According to an embodiment, the power regulator 220 may be implemented in the form of a low drop out (LDO) regulator or a switching regulator.

The power gauge 230 may measure usage state information of the battery 189 (e.g., battery capacity, the number of times of charging/discharging, voltage, or temperature).

The power management module 188 may determine charging state information (e.g., lifetime, overvoltage, low voltage, overcurrent, overcharging, over discharging, overheating, short circuit, or swelling) related to the charging of the battery 189 based on at least a part of the measured usage state information using, for example, the charging circuit 210, the voltage regulator 220, or the power gauge 230, and then it may determine whether the battery 189 is in an abnormal state or in a normal state based on at least a part of the determined charging state information. If it is determined that the battery 189 is in an abnormal state, the power management module 188 may regulate the charging of the battery 189 (e.g., charging current or voltage reduction or charging stop). According to an embodiment, at least parts of the functions of the power management module 188 may be performed by an external control device (e.g., processor 120).

The battery 189 may include, for example, a protection circuit module (PCM) 240. The protection circuit module 240 may perform various functions (e.g., pre-blocking function) to prevent the performance deterioration or damage of the battery 189. The protection circuit module 240 may be configured as at least a part of a battery management system (BMS) for additionally or alternatively performing cell balancing, measurement of the battery capacity, measurement of the number of times of charging/discharging, measurement of the temperature, or measurement of the voltage.

According to an embodiment, at least a part of the usage state information or the charging state information of the battery 189 may be measured using the corresponding sensor (e.g., temperature sensor) among the power gauge 230, the power management module 188, or the sensor module 176. In this case, according to an embodiment, the corresponding sensor (e.g., temperature sensor) of the sensor module 176 may be included as a part of the protection circuit module 240, or may be deployed in the neighborhood of the battery 189 as a separate device.

Figure 3:
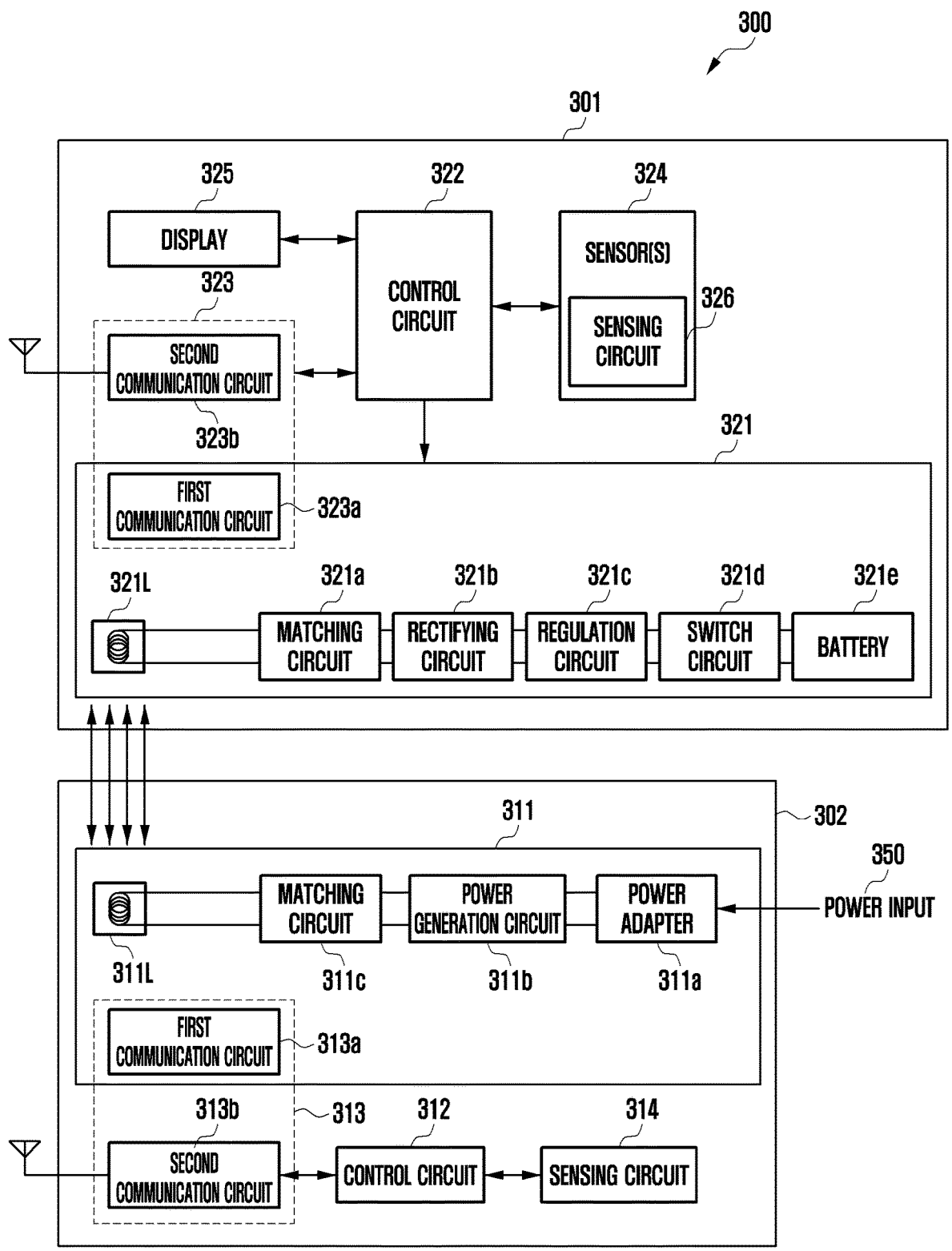
FIG. 3 is a diagram illustrating a wireless charging system according to certain embodiments.

FIG. 3 is a diagram illustrating a wireless charging system 300 according to certain embodiments. The electronic device 302, which can be considered a charger, wirelessly charges electronic device 301. However, a problem can occur if there is a metal substance in the charging path. The wireless charging signal can heat, and even incinerate the metal object, causing a fire, electrically burning the user, or electrocuting the user. Accordingly, system 300 includes a system that may prevent or reduce the probability of this. With reference to FIG. 3, an electronic device 302 (e.g., electronic device 102 of FIG. 1) (hereinafter, also referred to as a "power transmission device") according to certain embodiments may wirelessly supply a power to an external electronic device 301 (e.g., electronic device 101 of FIG. 1) (hereinafter, also referred to as a "power reception device"). For example, the electronic device 302 may charge a battery mounted in the external electronic device 301 by supplying the power to a coil 321L. The power transmission device 302 may include an induction circuit 311, a control circuit 312, a communication circuit 313, or a sensing circuit 314.

The induction circuit 311 may include a power adapter 311a receiving a power supply (or power) from outside and properly converting a voltage of the input power, a power generation circuit 311b generating the power, a matching circuit 311c maximizing the efficiency between a transmission coil 311L and a reception coil 321L, and/or transmission coil 311L.

The control circuit 312 may perform overall control of the power transmission device 302, and it may generate and transfer various kinds of messages required for the wireless power transmission to the communication circuit 313. In an embodiment, the control circuit 312 may calculate the power (or power amount) to be output to the power reception device 301 based on information received from the communication circuit 313. In an embodiment, the control circuit 312 may control the induction circuit 311 to transmit the power generated by the transmission coil 311L to the power reception device 301.

According to certain embodiments, the communication circuit 313 may include at least one of a first communication circuit 313a or a second communication circuit 313b. The first communication circuit 313a may communicate with, for example, the first communication circuit 323a of the power reception device 301 using a frequency which is similar to or proximate to the frequency that the transmission coil 311L uses for the power transfer.

The first communication circuit 313a may communicate with the first communication circuit 323a using the transmission coil 311L. Data (or a communication signal) generated by the first communication circuit 313a may be transmitted using the transmission coil 311L. The first communication circuit 313a may transfer the data to the power reception device 301 using a frequency shift keying (FSK) modulation technique. According to certain embodiments, the first communication circuit 313a may communicate with the first communication circuit 323a of the power reception device 301 by changing the frequency of the power signal being transferred through the transmission coil 311L. Further, the first communication circuit 313a may communicate with the first communication circuit 323a of the power reception device 301 by including the data in the power signal generated by the power generation circuit 311b. For example, the first communication circuit 313a may express the data by heightening or lowering the frequency of the power transmission signal.

The second communication circuit 313b may communicate with the second communication circuit 323b of the power reception device 301 using a frequency which is different from the frequency that the transmission coil 311L uses for the power transfer (e.g., outband type). For example, the second communication circuit 313b may acquire information related to the charging state (e.g., voltage value after being rectified, rectified voltage value (e.g., Vrec) information, current information (e.g., Tout) flowing in a coil or a rectifying circuit, various kinds of packets, and/or message) from the second communication circuit 323b using any one of various short-range communication systems, such as Bluetooth, Bluetooth low energy (BLE), Wi-Fi, and near field communication (NFC).

The sensing circuit 314 may include at least one sensor, and sense at least one state of the power transmission device 301.

The sensing circuit 314 may include at least one of a temperature sensor (thermometer), a motion sensor (such as a gyroscope, or accelerometer), or a current (or voltage) sensor (amp meter, volt meter). That is, the sensing circuit 314 may sense the temperature state of the power transmission device 302 using the temperature sensor, may sense the motion state of the power transmission device 302 using the motion sensor, and may sense the state of an output signal of the power transmission device 302, for example, the current size, voltage size, or power size, using the current (or voltage) sensor.

The current (or voltage) sensor may measure a signal in the induction circuit 311. The current (or voltage) sensor may measure a signal in at least a partial region of the matching circuit 311c or the power generation circuit 311b. For example, the current (or voltage) sensor may include a circuit measuring a signal at a front end of the coil 311L.

The sensing circuit 314 may be a circuit for foreign object detection (FOD).

The power reception device 301 (e.g., electronic device 101 of FIG. 1) may include a power reception circuit 321 (e.g., power management module 188 of FIG. 1), a control circuit 322 (e.g., processor 120 of FIG. 1), a communication circuit 323 (e.g., communication module 190 of FIG. 1), at least one sensor 324 (e.g., sensor module 176 of FIG. 1), a display 325 (e.g., display device 160 of FIG. 1), or a sensing circuit 326. In the power reception device 301, explanation of the configuration corresponding to the power transmission device 302 may be partially omitted.

The power reception circuit 321 may include a reception coil 321L wirelessly receiving a power from the power transmission device 302, a matching circuit 321a, a rectifying circuit 321b rectifying a received AC power to a DC, a regulation circuit 321c regulating a charging voltage, a switch circuit 321d, and/or a battery 321e (e.g., battery 189).

The control circuit 322 may perform the overall control of the power reception device 301, and it may generate and transfer various kinds of messages required for the wireless power transmission to the communication circuit 323.

The communication circuit 323 may include at least one of a first communication circuit 323a or a second communication circuit 323b. The first communication circuit 323a may communicate with the power transmission device 302 through the reception coil 321L.

The first communication circuit 323a may communication with the first communication circuit 313a using the reception coil 321L. Data (or communication signal) generated by the first communication circuit 323a may be transmitted using the reception coil 321L. The first communication circuit 323a may transfer the data to the power transmission device 302 using an amplitude shift keying (ASK) modulation technique. The second communication circuit 323b may communicate with the power transmission device 302 using any one of various short-range communication systems, such as Bluetooth, BLE, Wi-Fi, and NFC.

The at least one sensor 324 may include at least parts of a current/voltage sensor, a temperature sensor, an illumination sensor, or an acceleration sensor.

The display 325 may display various kinds of display information required for the wireless power transmission/reception.

The sensing circuit 326 may sense the power transmission device 302 by sensing a search signal or a power received from the power transmission device 302. The sensing circuit 326 may sense signal changes of input/output terminals of the coil 321L, the matching circuit 321a, or the rectifying circuit 321b through the signal of the coil 321L, which is generated by the signal output from the power transmission device 302. According to certain embodiments, the sensing circuit 326 may be included in the reception circuit 321.

Figure 4A:
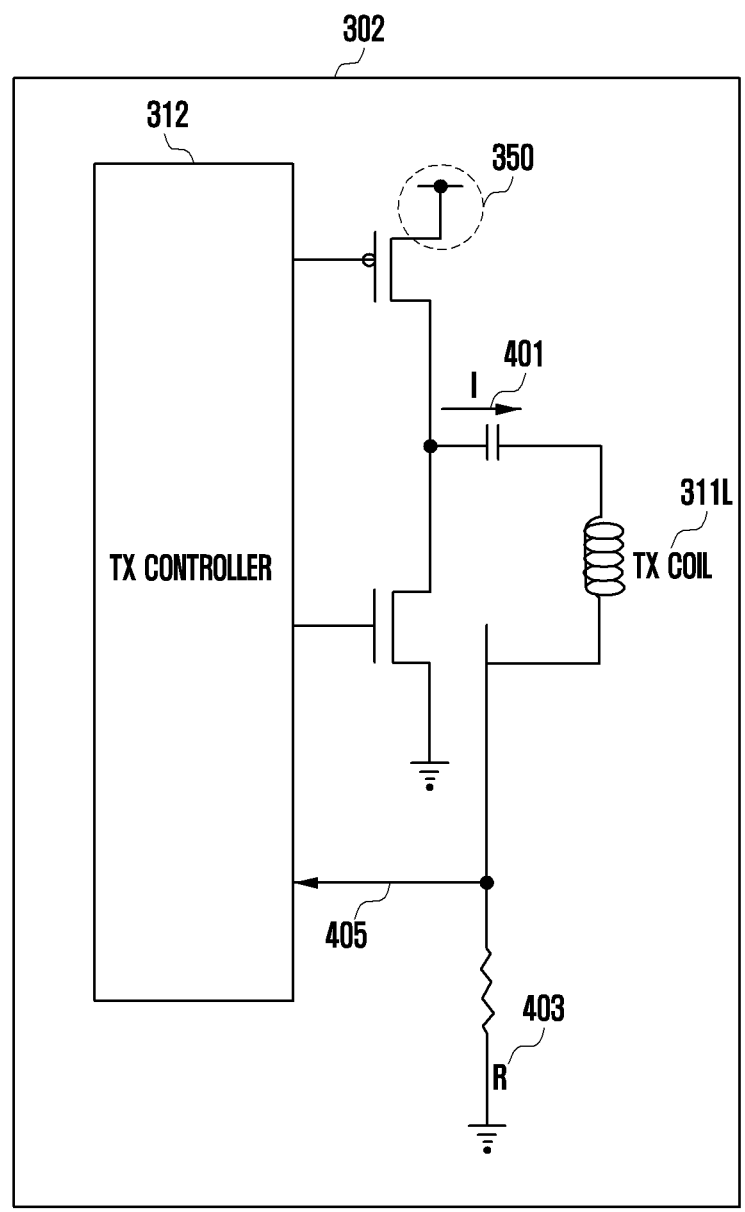
FIG. 4A is a block diagram of a power transmission device included in a wireless charging system according to certain embodiments.
Figure 4B:
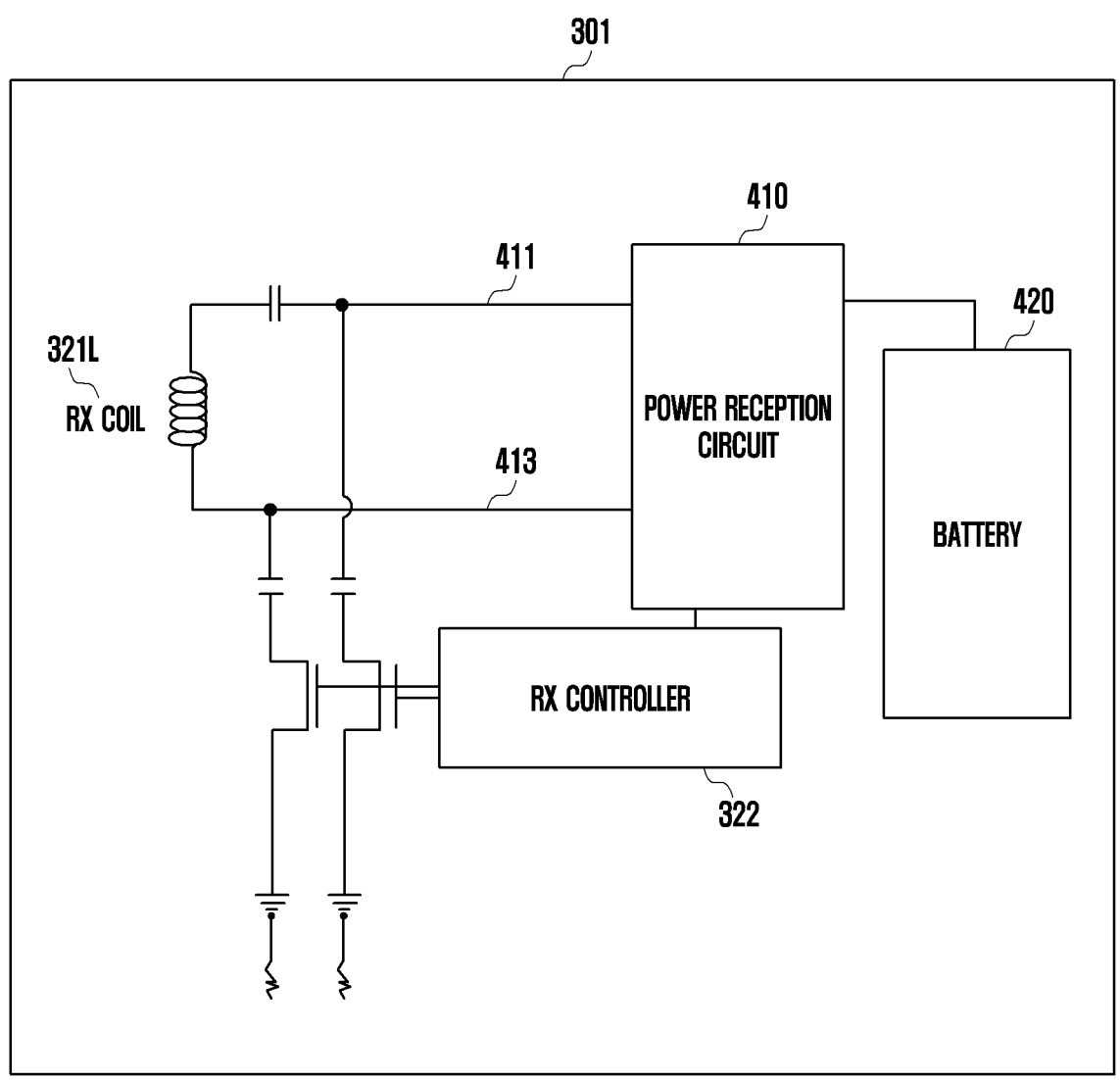
FIG. 4B is a block diagram of a power reception device included in a wireless charging system according to certain embodiments.

FIGS. 4A and 4B are block diagrams of a power transmission device and a power reception device included in a wireless charging system according to certain embodiments.

FIG. 4A is a diagram of certain circuits included in a power transmission device 302 (e.g., wireless charging device or charger). The power transmission device 302 may include a Tx controller (e.g., control circuit 312 of FIG. 3). The Tx controller 312 may perform overall control of the power transmission device 302. The power transmission device 302 may include a charging pad for transmitting wireless power. The charging pad can include a physical space upon which an external electronic device 301 may be placed. If an external electronic device (e.g., power reception device 301 of FIG. 3) is deployed on the charging pad, the power transmission device 302 may transmit the wireless power.

The TX controller 312 detects the existence/non-existence of an external object based on the measured current or a variation of current that flows to resistor R. Current I 401 is received by coil 311L, and current 403 flows from coil 311L. Based on the value/variation of the current, the TX controller 312 can determine whether metal is present on the pad. Accordingly, the TX controller 312 can determine whether or not to release a wireless charging protection mode.

With reference to FIG. 4A, the Tx controller 312 may calculate the power (or power amount) to be output to the external electronic device (e.g., power reception device 301 of FIG. 3) (e.g., electronic device). The Tx controller 312 may control at least one constituent element so that the power is transmitted to the external electronic device 301 through a Tx coil (e.g., transmission coil 311L of FIG. 3) in accordance with a supply of the power 350. For example, the Tx controller 312 may supply current 401 in accordance with the supply of the power 350 to the Tx coil 311L, and it may output the power to the external electronic device 301 through the Tx coil 311L. The Tx controller 312 may calculate the current 401 flowing through the Tx coil 311L using a resistor (R) 403 among the constituent elements. The Tx controller 312 may acquire a detection signal 405 for calculating the current 401 flowing through the Tx coil 311L.

The detection signal 405 may means a signal that is measured to calculate the current 401 flowing through the Tx coil 311L, and thus it may be a voltage value or a current value. In certain embodiments, an amp meter can measure the current, while in other embodiments, the current can be determined by a voltmeter across resistor R, by dividing the voltage with the known value for the resistor. For example, the Tx coil 311L may be deployed corresponding to a charging area of the charging pad of the power transmission device 302. According to an embodiment, the Tx controller 312 may calculate the current 401 in accordance with the supply of the power 350 as the detection signal 450, and it may calculate a variation of the current value based on the detection signal 405. The current 401 may be changed depending on the existence/nonexistence of an external object (e.g., power reception device 301 or a metal substance), resulting in a change to current 403. In certain embodiments, the power reception device 301 and the metal substance operate as a load, thereby causing the current to vary.

For example, the variation of the current value may include a difference value between the maximum current value and the minimum current value measured for a predetermined time. The variation of the current value may include a difference value between an initial current value and the present current value measured for the predetermined time.

Based on current 405, the TX controller 312 can determine whether or not a power reception device 301 and/or metal is present on the charging pad. The Tx controller 312 may calculate the current value of the detection signal 405 or the variation of the current value, and it may identify whether the calculated value exceeds a configured threshold value. The Tx controller 312 may measure the current value corresponding to the charging pad of the power transmission device 302, and it may determine whether the power reception device 301 is present. According to an embodiment, the Tx controller 312 may measure the current value, and it may determine whether a metal substance (e.g., metal) exists on the charging area of the charging pad. The power transmission device 302 may identify that the power reception device 301 is deployed on the charging pad based on the measured current value. If there is a metal substance while a charging process for the power reception device 301 is performed, the power transmission device 302 may enter the wireless charging protection mode to prevent heating the metal.

According to an embodiment, the power transmission device 302 may identify whether the metal substance exists on the charging area of the charging pad based on the measured current value. If the metal substance exists on the charging area of the charging pad, the power transmission device 302 may transmit the detection signal at predetermined time intervals. The detection signal may include a first detection signal for identifying the existence/nonexistence of the metal substance and a second detection signal for identifying the existence/nonexistence of the external electronic device 301. According to an embodiment, the first detection signal may be a signal that is transmitted over a time period that is shorter than the transmission time of the second detection signal. The power transmission device 302 may transmit the first detection signal for detecting the metal substance corresponding to the charging area of the charging pad. The first detection signal may be a signal having a transmission time that is relatively shorter than the transmission time of the second detection signal. The power transmission device 302 may detect the metal substance using the first detection signal.

Since the first detection has a shorter transmission time, and it may lower the possibility of heat generation of the metal substance. The power transmission device 302 may prevent a possible burn, fire, and/or electrocution caused by the heat generation of the metal substance.

FIG. 4B is a diagram of some circuits included in a power reception device 301 (e.g., external electronic device). The power reception device 301 transmits a header or SSP information. The power transmission device 302 can detect whether the power reception device is proximate to the pad by detecting the SSP information. In certain embodiments, when the SSP information is not detected, the power transmission device 301 determines that the power reception module 301 is not present.

The power reception device 301 may include an Rx controller (e.g., control circuit 322 of FIG. 3). The Rx controller 322 may perform overall control of the power reception device 301. The Rx controller 322 may at least partly control respective constituent elements constituting the power reception device 301 for wireless power reception. The power reception device 301 may include an Rx coil (e.g., reception coil 321L of FIG. 3) for receiving a wireless power supplied from the power transmission device 302. According to an embodiment, the power reception device 301 may receive the power output from the power transmission device 302 through the Rx coil 321L. For example, in the power reception device 301, the Rx coil 321L may be deployed corresponding to the charging area of the charging pad of the power transmission device 302.

With reference to FIG. 4B, the Rx controller 322 may receive the power transmitted from the power transmission device 302 through the Rx coil 321L. For example, the Rx controller 322 may charge a battery 420 of the power reception device 301 based on current being supplied through both ends 411 and 413 of the Rx coil 321L. According to an embodiment, the power reception device 301 may include a power reception circuit 410 (e.g., power reception circuit 321 of FIG. 3) for charging the battery 420 based on the power transmitted from the power transmission device 302. For example, the power reception circuit 410 may include a power management module, a communication circuit, a sensor, and/or a sensing circuit.

According to an embodiment, the Rx controller 322 may identify the power being supplied through the Rx coil 321L, and it may charge the battery 420 based on the power. According to an embodiment, the power reception device 301 may transmit a response signal to the power transmission device 302 in response to a wireless signal transmitted from the power transmission device 302.

The power reception device 301 may include signal strength packet (SSP) information in the response signal. In certain embodiments, the wireless signal transmitted from the power transmission device 302 can include a signal requesting the SSP. For example, the SSP information may include information for recognizing the power reception device 301. According to an embodiment, the power transmission device 302 may identify the response signal transmitted from the power reception device 301, and it may identify the existence/nonexistence of the SSP information based on the response signal. For example, if the SSP information does not exist in the response signal, the power transmission device 302 may determine that the power reception device 301 has been removed from the charging area of the charging pad. For example, if the SSP information exists in the response signal, the power transmission device 302 may determine that the power reception device 301 is located on the charging area of the charging pad. According to an embodiment, the power transmission device 302 may identify whether the power reception device 301 is deployed on the charging pad based on the existence/nonexistence of the SSP information. According to an embodiment, the power transmission device 302 may determine whether to release the wireless charging protection mode based on the existence/nonexistence of the SSP information.

According to an embodiment, if the SSP information exists in the response signal, the power transmission device 302 may calculate an SSP value corresponding to the SSP information. The power transmission device 302 may release the wireless charging protection mode if the SSP value exceeds a configured threshold value.

According to an embodiment, if the SSP information exists in the response signal, the power transmission device 302 may compare a Tx output amount of the power transmitted through the Tx coil 311L with an Rx reception amount of the power received through the Rx coil 321L. If the ratio of the Tx output amount to the Rx reception amount exceeds the configured threshold value, the power transmission device 302 may release the wireless charging protection mode. For example, if the Rx reception amount as compared to the Tx output amount is about 70% or more, the power transmission device 302 may release the wireless charging protection mode.

According to certain embodiments, a power transmission device (e.g., power transmission device 302 of FIG. 3) may include a induction circuit (e.g., induction circuit 311 of FIG. 3) configured to transmit a wireless power signal through a charging pad (e.g., transmission coil 311L of FIG. 3), and receive a signal from an external electronic device (e.g., power reception device 301 of FIG. 3), and at least one processor (e.g., control circuit 312 of FIG. 3) operatively connected to the induction circuit 311. The processor 312 may be configured to enter a wireless charging protection mode for wireless charging of the external electronic device 301, to measure a current value of the wireless power signal, and to release the wireless charging protection mode if the packet information is not included in the signal from the external electronic device and the measured current value or a variation of the current value exceeds a threshold value.

According to an embodiment, the wireless power signal may include a detection signal that varies based on the presence of a metal substance, and the processor 312 may be configured to identify whether the metal substance remains on the charging pad 311L based on a current value of the detection signal or a variation of the current value.

According to an embodiment, the processor 312 may be configured to calculate the variation of the current value of the detection signal, and to identify whether the metal substance remains on the charging pad 311L by identifying whether the variation exceeds a configured threshold value.

According to an embodiment, the processor 312 may be configured to identify that the metal substance on the charging pad 311L has been removed if the current value or the variation of the current value exceeds the threshold value, and to identify that the metal substance remains on the charging pad 311L if the current value or the variation of the current value does not exceed the threshold value.

According to an embodiment, the processor 312 may be configured to measure a first current value and a second current value of the detection signal being repeatedly transmitted in the wireless charging protection mode, and to calculate the variation of the detection signal based on a difference value between the first current value and the second current value.

According to an embodiment, the detection signal may include a first detection signal for detecting the metal substance and a second detection signal for identifying the packet information of the external device, and the first detection signal may have a transmission time that is shorter than the transmission time of the second detection signal.

According to an embodiment, the processor 312 may be connected to the external electronic device 301 using a short-range wireless communication, and may be configured to receive a response signal corresponding to the wireless power signal from the external electronic device 301.

According to an embodiment, the processor 312 may be configured to identify whether the packet information is included in the received response signal, to identify that the external electronic device 301 is located on the charging pad 311L if the packet information is included in the response signal, and to identify that the external electronic device 301 has been removed from the charging pad 311L if the packet information is not included in the response signal.

According to an embodiment, the processor 312 may be configured to be switched from the wireless charging protection mode to a standby mode.

According to certain embodiments, a power transmission device 302 may include a induction circuit 311 configured to transmit a wireless power signal through a charging pad 311L, a induction circuit 311 configured to receive a signal from an external device 301, and a processor 312 operatively connected to the induction circuit 311. The processor 312 may be configured to enter a wireless charging protection mode for wireless charging of the external device 301, to identify whether packet information is included in the signal transmitted from the external device 301 in the wireless charging protection mode, to measure a current value of the wireless power signal if the packet information is not included in the signal, to identify whether the measured current value or a variation of the current value exceeds a threshold value, and to release the wireless charging protection mode if the current value or the variation of the current value exceeds the threshold value.

According to an embodiment, the wireless power signal may include a detection signal for detecting existence/nonexistence of a metal substance, and the processor 312 may be configured to identify whether the metal substance remains on the charging pad 311L based on a current value of the detection signal or a variation of the current value.

According to an embodiment, the processor 312 may be configured to calculate a variation of the current value of the detection signal, and to identify whether the metal substance remains on the charging pad 311L by identifying whether the variation exceeds a configured threshold value.

According to an embodiment, the processor 312 may be configured to identify that the metal substance on the charging pad 311L has been removed if the variation exceeds the threshold value, and to identify that the metal substance remains on the charging pad 311L if the variation does not exceed the threshold value.

According to an embodiment, the detection signal may include a first detection signal for detecting the metal substance and a second detection signal for identifying the packet information of the external device, and the first detection signal may have a transmission time that is shorter than the transmission time of the second detection signal.

Figure 5:
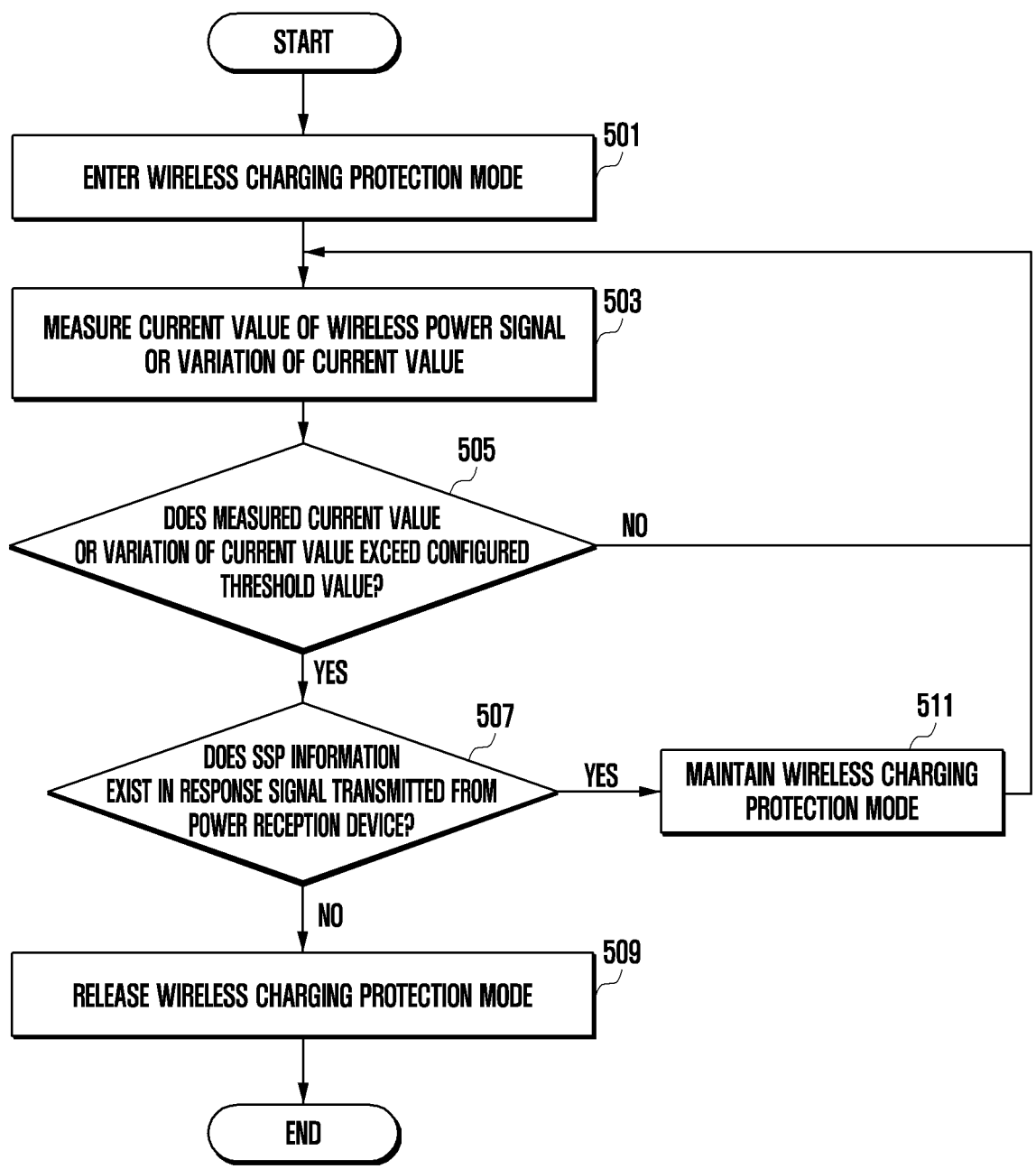
FIG. 5 is a flowchart explaining a method for releasing a wireless charging protection mode according to certain embodiments.

FIG. 5 is a flowchart explaining a method for releasing a wireless charging protection mode according to certain embodiments.

With reference to FIG. 5, a processor (e.g., control circuit 312 of a power transmission device 302 of FIG. 3) of a power transmission device (e.g., power transmission device 302 of FIG. 3) may enter a wireless charging protection mode. The wireless charging protection mode may be an operation mode that the power transmission device 302 enters if a metal substance exists on a charging pad while the power transmission device 302 performs a wireless charging process. In certain embodiments, the wireless charging protection mode comprises ceasing from providing wireless power to the power receiving device 301.

According to an embodiment, the processor 312 of the power transmission device 302 may measure a current value of a wireless power signal being transmitted through the charging pad, and it may identify whether the metal substance exists on the charging pad based on the measured current value. The wireless power signal may include a detection signal. The detection signal may include a first detection signal that varies based on existence/nonexistence of the metal substance and a second detection signal that varies based on the existence/nonexistence of the external electronic device 301. The processor 312 may transmit the first detection signal for detecting the metal substance. According to an embodiment, the first detection signal may be a signal having a transmission time that is relatively shorter than the transmission time of the second detection signal. According to an embodiment, because the processor 312 identifies the existence/nonexistence of the metal substance using the first detection signal having a shorter transmission time, it is possible to reduce the possibility of heat generation of the metal substance. The processor 312 may prevent a possible burn, fire, and/or electrocution by the heat generation of the metal substance.

When the metal substance does not remain on the charging area of the charging pad, the power transmission device 302 may release the wireless charging protection mode. If the power reception device 301 is not located on the charging area of the charging pad, the power transmission device 302 may release the wireless charging protection mode. The power transmission device 302 may identify whether the metal substance remains on the charging area of the charging pad using the first detection signal, and it may identify the existence/nonexistence of the power reception device 301 on the charging area of the charging pad using the second detection signal. According to an embodiment, the power transmission device 302 may identify that both the metal substance and the power reception device 301 have been removed from the charging pad, and may release the wireless charging protection mode.

At operation 501, the processor 312 of the power transmission device 302 may enter the wireless charging protection mode. For example, the power transmission device 302 may proceed with the wireless charging process for the power reception device 301, and it may have entered the wireless charging protection mode. The power transmission device 302 may identify the metal substance on the charging pad, and it may be in the wireless charging protection mode. In certain embodiments, the wireless protection mode may result in a cessation of transmission of wireless power to the power reception device 301.

At operation 503, the processor 312 of the power transmission device 302 may measure the current value of the wireless power signal. The power transmission device 302 may transmit the wireless power signal to the external electronic device (e.g., power reception device 301 of FIG. 3) in the wireless charging protection mode, and it may measure the current value of the wireless power signal. According to an embodiment, the power transmission device 302 may include the charging pad, and it may transmit the wireless power signal using a Tx coil (e.g., Tx coil 311L of FIG. 3) deployed on the charging pad. The wireless power signal may include the detection signal. The detection signal may include the first detection signal that varies based on whether the metal substance exists on the charging pad of the power transmission device 302 and the second detection signal that varies based whether the power reception device 301 is deployed on the charging pad.

The power transmission device 302 may identify whether the metal substance exists on the charging area of the charging pad based on the measured current value, or it may identify whether the power reception device 301 is deployed corresponding to the charging area of the charging pad. The power transmission device 302 may identify the existence/nonexistence of the metal substance based on the first detection signal (e.g., first detection signal for detecting the existence/nonexistence of the metal substance), and it may identify whether the power reception device 301 is deployed based on the second detection signal (e.g., second detection signal for detecting the existence/nonexistence of the metal substance and/or the power reception device 301 (for identifying SSP information)). The first detection signal may be a signal having a transmission time that is shorter than the transmission time of the second detection signal. The first detection signal may be a signal that is transmitted for about 4 ms time, and it may be a signal for detecting the existence/nonexistence of the metal substance on the charging area of the charging pad.

At operation 505, the processor 312 of the power transmission device 302 may identify whether the measured current value or the variation of the current value exceeds the configured threshold value. For example, the wireless power signal may be repeatedly transmitted based on the configured time intervals, and the processor 312 may measure the current value of the wireless power signal. The processor 312 may calculate the variation of the current value of the wireless power signal, and it may identify whether the variation exceeds the configured threshold value. For example, the processor 312 may measure the first current value of the first wireless power signal initially transmitted in the wireless charging protection mode. The processor 312 may measure the second current value of the wireless power signal being currently transmitted, and it may calculate the difference value between the first current value and the second current value. The variation of the current value may mean the difference value. The processor 312 may identify whether the calculated difference value exceeds the threshold value. According to an embodiment, if the difference value exceeds the threshold value, the power transmission device 302 may identify that the metal substance has been removed from the charging pad. According to an embodiment, if the difference value does not exceed the threshold value, the power transmission device 302 may identify that the metal substance remains on the charging pad.

If the difference value exceeds the threshold value at operation 505, the processor 312 of the power transmission device 302, at operation 507, may identify the existence/nonexistence of the SSP information of the response signal transmitted from the power reception device 301. According to an embodiment, the power transmission device 302 may transmit the wireless power signal to the power reception device 301, and the power reception device 301 may transmit the response signal to the wireless power signal to the power transmission device 302. The response signal may include the SSP information. The SSP information may be generated by the power reception device 301. According to an embodiment, the power transmission device 302 may identify the existence/nonexistence of the SSP information of the response signal, and it may determine whether the power reception device 301 is located on the charging pad. For example, if the SSP information is included in the response signal, the power reception device 301 may be in a state where it is deployed on the charging pad. If the SSP information is not included in the response signal, the power reception device 301 may be in a state where it has been removed from the charging pad.

If the SSP information is not included in the response signal at operation 507, the processor 312 of the power transmission device 302 may release the wireless charging protection mode. For example, the processor 312 may be switched from the wireless charging protection mode to the standby mode. If the SSP information is included in the response signal at operation 507, the processor 312 of the power transmission device 302, at operation 511, may maintain the wireless charging protection mode.

According to certain embodiments, the power transmission device 302 may identify whether the metal substance exists on the charging pad and/or whether the power reception device 301 is located on the charging pad. The power transmission device 302 may identify that the metal substance and/or the power reception device 301 have been removed from the charging pad in all, and it may release the wireless charging protection mode.

According to an embodiment, the power transmission device 302 may calculate the SSP value of the signal strength packet (SSP) in a state where the power reception device 301 is deployed on the charging pad. If the calculated SSP value exceeds the configured threshold value, the power transmission device 302 may release the wireless charging protection mode. For example, the state where the calculated SSP value exceeds the configured threshold value may mean that the metal substance does not exist on the charging pad.

According to an embodiment, if the SSP information exists in the response signal, the power transmission device 302 may compare the Tx output amount of the power transmitted through the Tx coil 311L with the Rx reception amount of the power received through the Rx coil 321L. If the ratio of the Rx reception amount as compared to the Tx output amount is about 70% or more, the power transmission device 302 may release the wireless charging protection mode. For example, the state where the Rx reception amount to the Tx output amount exceeds the configured threshold value may mean that the metal substance does not exist on the charging pad.

Figure 6A:
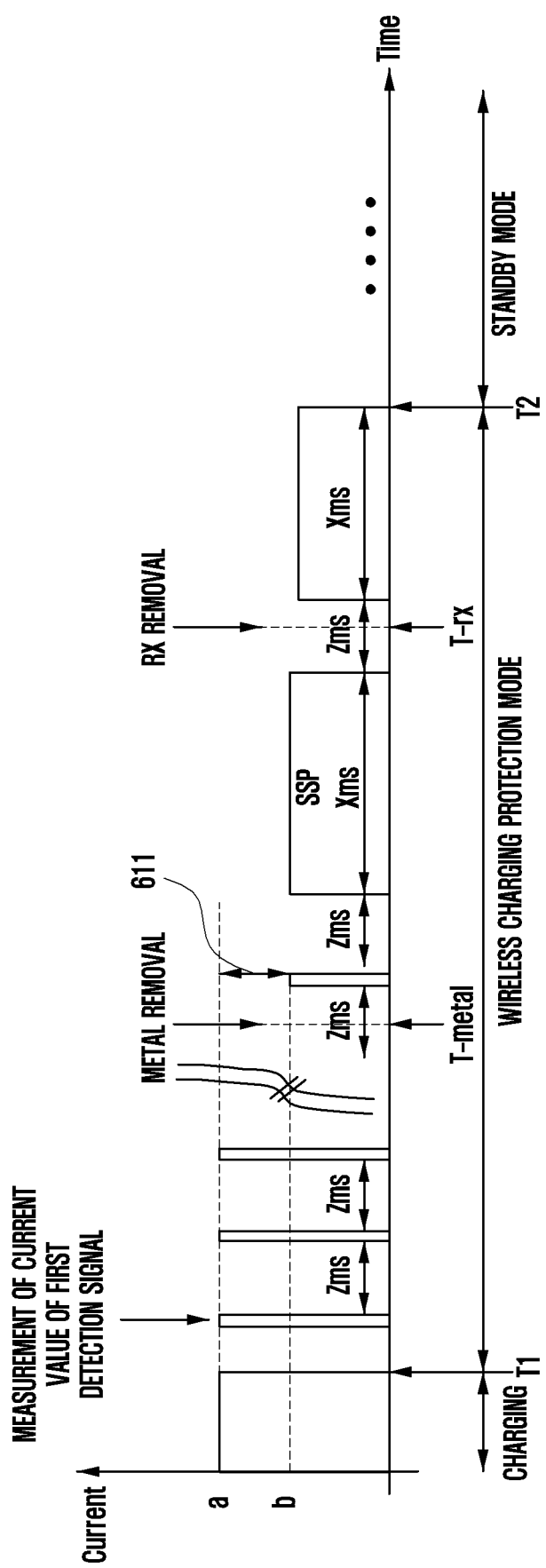
FIG. 6A is a diagram illustrating a time graph of a release process of a wireless charging protection mode according to an embodiment.
Figure 6B:
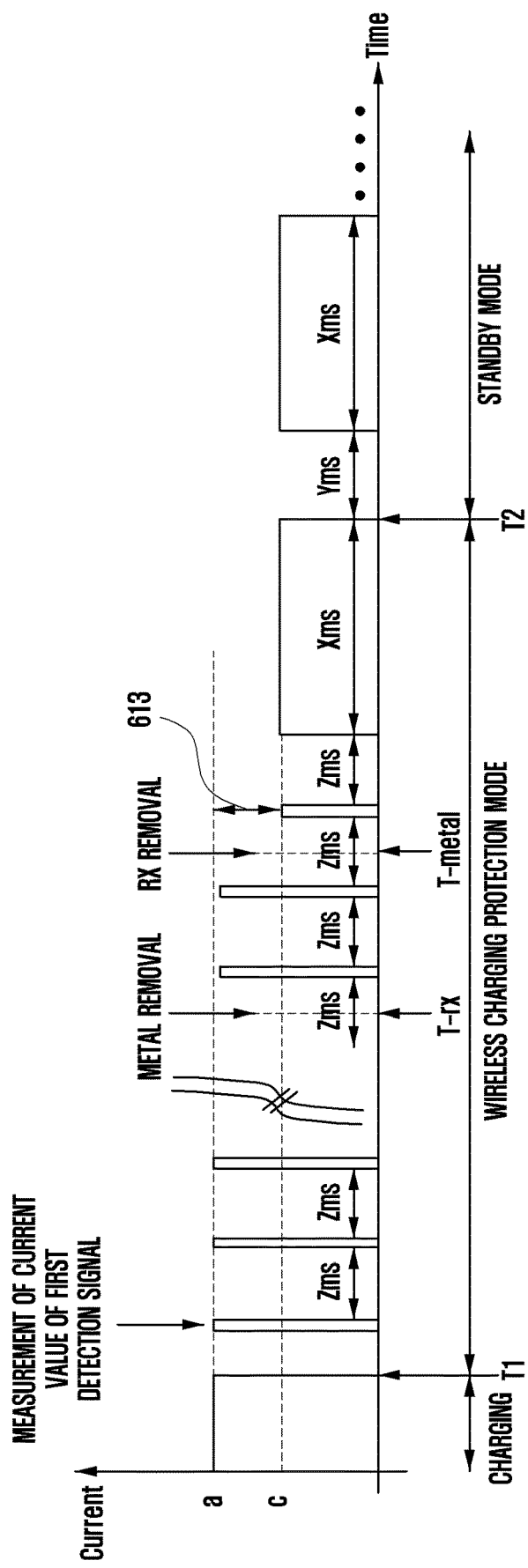
FIG. 6B is a diagram illustrating a time graph of a release process of a wireless charging protection mode according to an embodiment.

FIGS. 6A and 6B are diagrams illustrating a time graph of a release process of a wireless charging protection mode according to an embodiment.

FIG. 6A illustrates a first embodiment in which when the power transmission device (e.g., power transmission device 302 of FIG. 3) transmits the detection signal for detecting the metal substance, the metal substance is removed from the charging pad, first, and the power reception device (e.g., power reception device 301 of FIG. 3) is removed from the charging pad, later.

With reference to FIG. 6A, the power transmission device 302 may sense that the power reception device 301 is located on the charging pad, and it may be in a state where it performs the wireless charging with respect to the power reception device 301.

According to an embodiment, at the first time T1, the power transmission device 302 may enter the wireless charging protection mode because of detection of the metal substance. According to an embodiment, the power transmission device 302 may transmit the first detection signal for identifying the existence/nonexistence of the metal substance on the charging pad from the first time T1. For example, the first detection signal may include the wireless power signal initially transmitted from the power transmission device 302 after the first time T1. According to an embodiment, the power transmission device 302 may measure the first current value a of the first detection signal. The power transmission device 302 may periodically transmit and repeatedly measure the current value of the wireless power signal, and calculate the variation 611 of the current value, e.g., the amount of the current value during the current period minus the value during the previous period.

According to an embodiment, the power transmission device 302 may identify the time T-metal when the metal substance is removed based on the current value of the variation 611 of the current value. If the measured current value or the variation 611 of the current value exceeds the configured threshold value, the power transmission device 302 may identify that the metal substance has been removed from the charging area of the charging pad. For example, after the time T-metal when the metal substance is removed, the power transmission device 302 may measure the second current value b of the second detection signal.

The power transmission device 302 may calculate the difference value (e.g., absolute value a-b) between the first current value a and the second current value b, and it may compare the difference value with the configure threshold value. According to an embodiment, if the difference value exceeds the threshold value, the power transmission device 302 may determine that the metal substance has been removed from the charging pad. When the difference value does not exceed the threshold value, the power transmission device 302 may determine that the metal substance has not been removed from the charging pad.

The power transmission device 302 may measure the current value, and it may identify the time T-metal when the metal substance is removed based on the measured current value. The power transmission device 302 may determine the threshold value corresponding to a case where the metal substance does not exist on the charging pad. When the measured current value is equal to or smaller than the configured threshold value, the power transmission device 302 may identify that the metal substance has been removed from the charging pad.

According to an embodiment, if it is determined that the metal substance has been removed, the power transmission device 302 may receive the response signal to the wireless power signal from the power reception device 301. According to an embodiment, the power reception device 301 may generate the response signal including the SSP information, and it may transmit the response signal to the power transmission device 302. According to an embodiment, the power transmission device 302 may determine whether the power reception device 301 is located on the charging area of the charging pad based on the SSP information included in the response signal. According to an embodiment, if the SSP information is included in the response signal, it may mean a state where the power reception device 301 is located on the charging area of the charging pad. According to an embodiment, if the SSP information is not included in the response signal, it may mean a state where the power reception device 301 has been removed from the charging area of the charging pad.

According to an embodiment, the power transmission device 302 may identify that the power reception device 301 has been removed from the charging area of the charging pad based on the existence/nonexistence of the SSP information in the response signal. For example, if the power reception device 301 has been removed from the charging area of the charging pad (e.g., if the power reception device 301 is removed at a time T-rx), the power transmission device 302 is unable to receive the SSP information from the power reception device 301. The power transmission device 302 may identify the non-reception of the SSP information, and it may identify that the power reception device 301 has been removed from the charging area of the charging pad.

According to an embodiment, at the second time T2, the power transmission device 302 may release the wireless charging protection mode. For example, the power transmission device 302 may be switched from the wireless charging protection mode to the standby mode.

According to an embodiment, the power transmission device 302 may identify the time T-metal when the metal substance is removed from the charging area of the charging pad and/or the time T-rx when the power reception device 301 is removed from the charging pad. According to an embodiment, the power transmission device 302 may identify that both the metal substance and the power reception device 301 have been removed from the charging pad, and it may release the wireless charging protection mode.

FIG. 6B illustrates a second embodiment in which when the power transmission device 302 transmits the detection signal for detecting the metal substance, the power reception device 301 is primarily removed from the charging pad, and the metal substance is secondarily removed from the charging pad.

With reference to FIG. 6B, in the same manner as FIG. 6A, the power transmission device 302 may be in a state where it performs the wireless charging with respect to the power reception device 301. With reference to FIG. 6B, as compared with FIG. 6A, there is a difference in the orders of removing the power reception device 301 and the metal substance, but the processes of releasing the wireless charging mode may be partly equal to each other. The detailed explanation of the contents in FIG. 6B that overlap the contents in FIG. 6A may be omitted.

According to an embodiment, at the first time T1, the power transmission device 302 may enter the wireless charging protection mode. According to an embodiment, the power transmission device 302 may transmit the first detection signal for identifying the existence/nonexistence of the metal substance on the charging pad from the first time T1. For example, the first detection signal may include the wireless power signal initially transmitted from the power transmission device 302 after the first time T1. According to an embodiment, the power transmission device 302 may measure the first current value a of the first detection signal. The power transmission device 302 may repeatedly measure the current value of the wireless power signal, and it may calculate the variation 613 of the current value.

According to an embodiment, the power reception device 301 may be primarily removed from the charging area of the charging pad in a situation that the detection signal is transmitted from the power transmission device 302, and the metal substance may be secondarily removed from the charging area of the charging pad. According to an embodiment, if the power reception device 301 is removed, the current value of the detection signal may be lowered, but the variation of the current value may not exceed the threshold value.

According to an embodiment, the power transmission device 302 may identify the time T-metal when the metal substance is removed based on the current value. According to an embodiment, if the variation 613 of the measured current value exceeds the configured threshold value, the power transmission device 302 may identify that the metal substance has been removed from the charging pad. For example, after the time T-metal when the metal substance is removed, the power transmission device 302 may measure the second current value c of the second detection signal. The second current value b illustrated in FIG. 6A and the second current value c illustrated in FIG. 6B may have a difference in current value due to the removal of the power reception device 301. The power transmission device 302 may calculate the difference value (e.g., absolute value a-c) between the first current value a and the second current value c, and it may compare the difference value with the configure threshold value. According to an embodiment, if the difference value exceeds the threshold value, the power transmission device 302 may determine that the metal substance has been removed from the charging pad. According to an embodiment, if the difference value does not exceed the threshold value, the power transmission device 302 may determine that the metal substance has not been removed from the charging pad.

According to an embodiment, the power transmission device 302 may measure the current value, and it may identify the time T-metal when the metal substance is removed based on the measured current value. According to an embodiment, the power transmission device 302 may determine the threshold value corresponding to a case where the metal substance does not exist on the charging pad. According to an embodiment, if the measured current value is equal to or smaller than the configured threshold value, the power transmission device 302 may identify that the metal substance has been removed from the charging pad.

According to an embodiment, the power transmission device 302 may receive the response signal to the wireless power signal from the power reception device 301. The power transmission device 302 may determine whether the power reception device 301 is located on the charging area of the charging pad based on the SSP information included in the response signal. The power transmission device 302 may identify that the SSP information is not included in the response signal transmitted from the power reception device 301, and it may release the wireless charging protection mode.

Figure 7A:
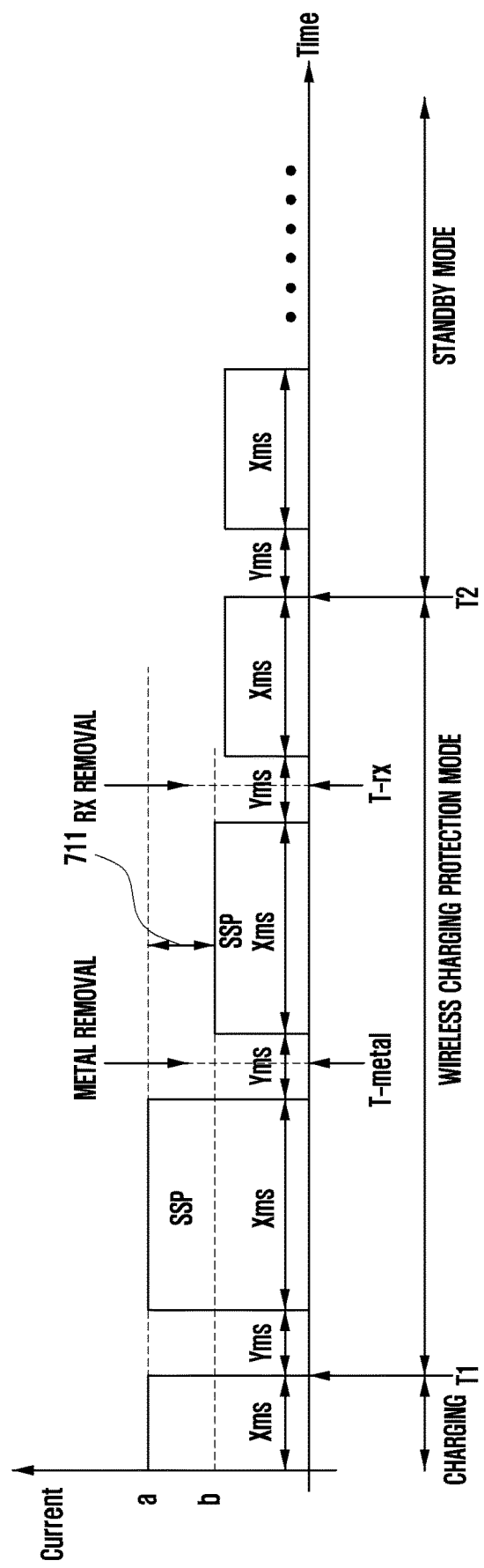
FIG. 7A is a diagram illustrating a time graph of a release process of a wireless charging protection mode according to another embodiment.
Figure 7B:
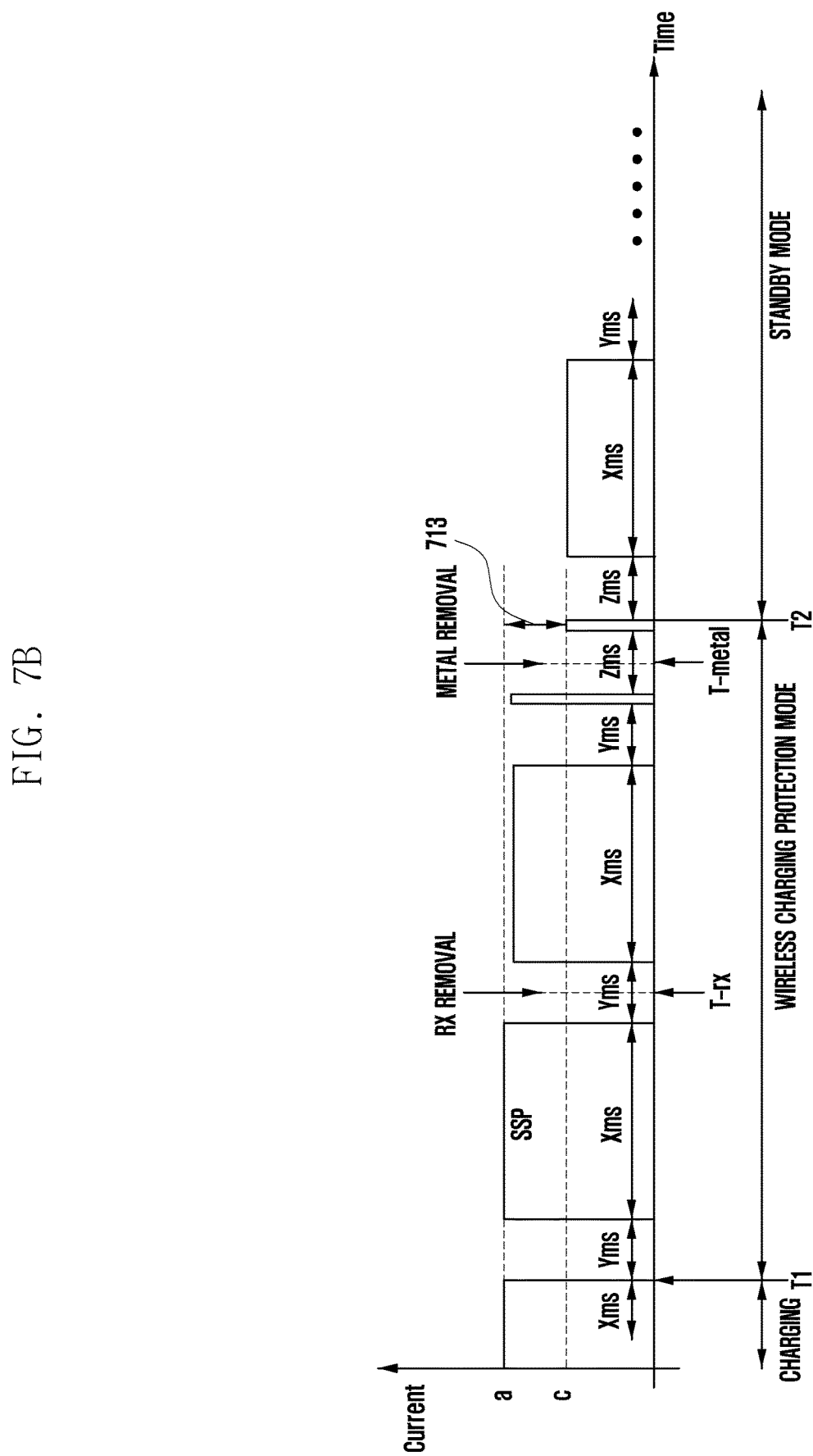
FIG. 7B is a diagram illustrating a time graph of a release process of a wireless charging protection mode according to another embodiment.

FIGS. 7A and 7B are diagrams illustrating a time graph of a release process of a wireless charging protection mode according to another embodiment.

FIG. 7A illustrates a first embodiment in which when the power transmission device (e.g., power transmission device 302 of FIG. 3) transmits the wireless power signal for wireless charging of the power reception device (e.g., power reception device 301 of FIG. 3), the metal substance is primarily removed from the charging pad, and the power reception device 301 is secondarily removed from the charging pad.

With reference to FIG. 7A, the power transmission device 302 may sense that the power reception device 301 is located on the charging area of the charging pad, and it may be in a state where it performs the wireless charging with respect to the power reception device 301.

According to an embodiment, at the first time T1, the power transmission device 302 may enter the wireless charging protection mode. According to an embodiment, the power transmission device 302 may transmit the wireless power signal for wireless charging of the power reception device 301 from the first time T1. According to an embodiment, the power transmission device 302 may receive a response signal to the wireless power signal from the power reception device 301. The response signal may include SSP information of the power reception device 301. The power transmission device 302 may determine whether the power reception device 301 has been removed from the charging pad based on the existence/nonexistence of the SSP information included in the response signal. According to an embodiment, after the first time T1, the power transmission device 302 may transmit the first wireless power signal, and it may measure the first current value a of the first wireless power signal. The power transmission device 302 may repeatedly measure the current value of the wireless power signal, and it may calculate the variation of the current value.

According to an embodiment, the power transmission device 302 may identify the time T-metal when the metal substance is removed based on the current value or the variation 711 of the current value. According to an embodiment, if the measured current value or the variation of the current value exceeds the configured threshold value, the power transmission device 302 may identify that the metal substance has been removed from the charging area of the charging pad.

According to an embodiment, the power transmission device 302 may identify that the metal substance has been removed from the charging area of the charging pad based on the measured current value or the variation of the current value, and it may identify the existence/nonexistence of the SSP information of the response signal. According to an embodiment, the power transmission device 302 may identify that the power reception device 301 has been removed from the charging area of the charging pad based on the existence/nonexistence of the SSP information.

According to an embodiment, the power transmission device 302 may identify that the metal substance and/or the power reception device 301 have been removed from the charging area of the charging pad. According to an embodiment, the power transmission device 302 may identify that the metal substance and the power reception device 301 have been removed from the charging pad in all, and it may release the wireless charging protection mode.

FIG. 7B illustrates a second embodiment in which when the power transmission device 302 transmits the wireless power signal for the wireless charging of the power reception device 301, the power reception device 301 is removed from the charging pad, and the metal substance is secondarily removed from the charging pad.

With reference to FIG. 7B, in the same manner as FIG. 7A, the power transmission device 302 may sense that the power reception device 301 is located on the charging area of the charging pad, and it may be in a state where it performs the wireless charging with respect to the power reception device 301. With reference to FIG. 7B, as compared with FIG. 7A, there is a difference in the orders of removing the power reception device 301 and the metal substance, but the processes of releasing the wireless charging mode may be partly equal to each other. The detailed explanation of the contents in FIG. 7B that overlap the contents in FIG. 7A may be omitted.

According to an embodiment, at the first time T1, the power transmission device 302 may enter the wireless charging protection mode. According to an embodiment, the power transmission device 302 may transmit the wireless power signal for the wireless charging of the power reception device 301 from the first time T1. According to an embodiment, the power transmission device 302 may receive the response signal of the wireless power signal from the power reception device 301. The response signal may include SSP information of the power reception device 301. The power transmission device 302 may determine whether the power reception device 301 has been removed from the charging pad based on the existence/nonexistence of the SSP information included in the response signal. According to an embodiment, after the first time T1, the power transmission device 302 may transmit the first wireless power signal, and it may measure the first current value a of the first wireless power signal. The power transmission device 302 may repeatedly measure the current value of the wireless power signal, and it may calculate the variation of the current value. The power transmission device 302 may measure the current value of the wireless power signal or the variation of the current value.

According to an embodiment, the power transmission device 302 may determine whether the power reception device 301 has been removed from the charging area of the charging pad based on the existence/nonexistence of the SSP information included in the response signal. The power transmission device 302 may identify that the SSP information is not included in the response signal based on the response signal, and it may identify that the power reception device 301 has been removed from the charging area of the charging pad.

According to an embodiment, the power transmission device 302 may transmit the detection signal for detecting the metal substance. According to an embodiment, the detection signal may be a signal having a transmission time that is relatively shorter than the transmission time of the wireless power signal. After the time T-rx when the power reception device 301 is removed, the power transmission device 302 may transmit the first detection signal for identifying the existence/nonexistence of the metal substance on the charging area of the charging pad. According to an embodiment, the power transmission device 302 may measure the first current value a of the first detection signal. The power transmission device 302 may measure the variation 713 of the current value of the detection signal, and it may compare the difference value according to the variation 713 with the configured threshold value. According to an embodiment, if the difference value exceeds the threshold value, the power transmission device 302 may determine that the metal substance has been removed from the charging pad. According to an embodiment, if the difference value does not exceed the threshold value, the power transmission device 302 may determine that the metal substance has not been removed from the charging pad.

According to an embodiment, the power transmission device 302 may identify that the metal substance has been removed according to the detection signal, and it may release the wireless charging protection mode.

According to certain embodiments, a method for operating an electronic device may include entering a wireless charging protection mode for wireless charging of an external device (e.g., power reception device 301 of FIG. 3), measuring a current value of a wireless power signal transmitted through a charging pad (e.g., transmission coil 311L of FIG. 3), identifying whether the measured current value or a variation of the current value exceeds a threshold value, identifying whether packet information is included in a signal transmitted from the external device 301 if the current value or the variation of the current value exceeds the threshold value, and releasing the wireless charging protection mode if the packet information is not included in the signal.

According to an embodiment, the wireless power signal may include a detection signal for detecting the existence/nonexistence of a metal substance, and the method may further include identifying whether the metal substance remains on the charging pad based on a current value of the detection signal or a variation of the current value.

According to an embodiment, identifying whether the metal substance remains on the charging pad 311L may include calculating the variation of the current value of the detection signal, and identifying whether the metal substance remains on the charging pad 311L by identifying whether the variation exceeds a configured threshold value.

According to an embodiment, the method may further include identifying that the metal substance on the charging pad 311L has been removed if the variation exceeds the threshold value, and identifying that the metal substance remains on the charging pad 311L if the variation does not exceed the threshold value.

According to an embodiment, calculating the variation of the current value of the detection signal may include measuring a first current value and a second current value of the detection signal being repeatedly transmitted in the wireless charging protection mode, and calculating the variation of the detection signal based on a difference value between the first current value and the second current value.

According to an embodiment, the detection signal may include a first detection signal for detecting the metal substance and a second detection signal for identifying the packet information of the external device, and the first detection signal may have a transmission time that is shorter than the transmission time of the second detection signal.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is reasonable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiment s of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A power transmission device comprising:
an induction circuit configured to transmit a wireless power signal through a charging pad and receive a response signal from an external device; and
at least one processor operatively connected to the induction circuit,
wherein the at least one processor is configured to:
enter, in response to detecting a metal substance on the charging pad, a wireless charging protection mode for wireless charging of the external device,
measure a current value of the wireless power signal on the wireless charging protection mode,
identify whether the metal substance remains on the charging pad based on a variation of the measured current value,
identify whether the external device remains on the charging pad based on packet information included in the response signal received from the external device, and
release the wireless charging protection mode when both the metal substance and the external device are removed from the charging pad.

2. The power transmission device of claim 1, wherein the wireless power signal includes a detection signal that varies based on existence of the metal substance, and
the at least one processor is configured to identify whether the metal substance remains on the charging pad based on a current value of the detection signal or a variation of the current value of the detection signal.

3. The power transmission device of claim 2, wherein the at least one processor is configured to:
calculate the variation of the current value of the detection signal, and
identify whether the metal substance remains on the charging pad by identifying whether the variation exceeds a threshold value.

4. The power transmission device of claim 3, wherein the at least one processor is configured to:
identify that the metal substance on the charging pad has been removed if the variation exceeds the threshold value, and
identify that the metal substance remains on the charging pad if the variation does not exceed the threshold value.

5. The power transmission device of claim 3, wherein the at least one processor is configured to:
measure a first current value and a second current value of the detection signal being periodically transmitted in the wireless charging protection mode, and
calculate the variation of the detection signal based on a difference value between the first current value and the second current value.

6. The power transmission device of claim 2, wherein the detection signal comprises a first detection signal that varies based on existence of the metal substance and a second detection signal requesting transmission of the packet information of the external device, and
the first detection signal has a transmission time that is shorter than the transmission time of the second detection signal.

7. The power transmission device of claim 1, wherein the at least one processor is connected to the external device using a short-range wireless communication, and is configured to receive the response signal corresponding to the wireless power signal from the external device.

8. The power transmission device of claim 7, wherein the at least one processor is configured to:
identify whether the packet information is included in the received response signal,
identify that the external device is located on the charging pad if the packet information is included in the response signal, and
identify that the external device has been removed from the charging pad if the packet information is not included in the response signal.

9. The power transmission device of claim 1, wherein the at least one processor is configured to be switched from the wireless charging protection mode to a standby mode.

10. A power transmission device comprising:
an induction circuit configured to transmit a wireless power signal through a charging pad and receive a response signal from an external device; and
at least one processor operatively connected to the induction circuit,
wherein the at least one processor is configured to:
enter, in response to detecting a metal substance on the charging pad, a wireless charging protection mode for wireless charging of the external device,
identify whether the external device remains on the charging pad based on packet information included in the response signal received from the external device,
measure a current value of the wireless power signal when the external device is removed from the charging pad, and
identify whether the metal substance remains on the charging pad based on a variation of the measured current value, and
release the wireless charging protection mode when both the metal substance and the external device are removed from the charging pad.

11. The power transmission device of claim 10, wherein the wireless power signal comprises a detection signal that varies based on existence/nonexistence of the metal substance, and
the at least one processor is configured to identify whether the metal substance remains on the charging pad based on a current value of the detection signal.

12. The power transmission device of claim 11, wherein the at least one processor is configured to:
calculate a variation of the current value of the detection signal, and
identify whether the metal substance remains on the charging pad by identifying whether the variation exceeds a threshold value.

13. The power transmission device of claim 12, wherein the at least one processor is configured to:
identify that the metal substance on the charging pad has been removed if the variation exceeds the threshold value, and
identify that the metal substance remains on the charging pad if the variation does not exceed the threshold value.

14. The power transmission device of claim 11, wherein the detection signal comprises a first detection signal that varies based on the existence/nonexistence of the metal substance and a second detection signal requesting the packet information of the external device, and
the first detection signal has a transmission time that is shorter than the transmission time of the second detection signal.

15. A method for operating an electronic device, comprising:

entering, in response to detecting a metal substance on a charging pad of the electronic device, a wireless charging protection mode for wireless charging of an external device;

measuring a current value of a wireless power signal transmitted through the charging pad on the wireless charging protection mode;

identifying whether the metal substance remains on the charging pad based on a variation of the current value;

identifying whether the external device remains on the charging pad based on packet information included in a response signal received from the external device; and releasing the wireless charging protection mode when both the metal substance and the external device are removed from the charging pad.

16. The method of claim 15, wherein the wireless power signal includes a detection signal that varies based on existence/nonexistence of they metal substance, and the method further comprises identifying whether the metal substance remains on the charging pad based on a current value of the detection signal or a variation of the current value of the detection signal.

17. The method of claim 16, wherein identifying whether the metal substance remains on the charging pad comprises:

calculating the variation of the current value of the detection signal; and identifying whether the metal substance remains on the charging pad by identifying whether the variation exceeds a threshold value.

18. The method of claim 17, further comprising:

identifying that the metal substance on the charging pad has been removed if the variation exceeds the threshold value; and identifying that the metal substance remains on the charging pad if the variation does not exceed the threshold value.

19. The method of claim 17, wherein calculating the variation of the current value of the detection signal comprises:

measuring a first current value and a second current value of the detection signal being periodically transmitted in the wireless charging protection mode; and calculating the variation of the detection signal based on a difference value between the first current value and the second current value.

20. The method of claim 16, wherein the detection signal comprises a first detection signal that varies based on the existence/nonexistence of the metal substance and a second detection signal requesting the packet information of the external device, and the first detection signal has a transmission time that is shorter than the transmission time of the second detection signal.

* * * * *

UNITED STATES PATENT AND TRADEMARK OFFICE
CERTIFICATE OF CORRECTION

PATENT NO. : 11,456,625 B2
APPLICATION NO. : 16/936496
DATED : September 27, 2022
INVENTOR(S) : Kwangseob Kim et al.

It is certified that error appears in the above-identified patent and that said Letters Patent is hereby corrected as shown below:

In the Claims

Column 27, Claim 16, Line 20 should read as follows:
--…existence/nonexistence of the metal substance…--

Signed and Sealed this
Twenty-fifth Day of October, 2022

Katherine Kelly Vidal
*Director of the United States Patent and Trademark Office*